(12) United States Patent
Hubbard

(10) Patent No.: US 6,523,339 B2
(45) Date of Patent: Feb. 25, 2003

(54) VARIABLE MODE JET ENGINE—COMPACT

(76) Inventor: Adrian Alexander Hubbard, 39, Egerton Road, Bushbury, Wolverhampton West Mids (GB), WV10 8AU ( * ) Notice: Subject to any disclaimer, the term of this patent is extended or adjusted under 35 U.S.C. 154(b) by 0 days.

(21) Appl. No.: 09/765,706

(22) Filed: Jan. 22, 2001

(65) Prior Publication Data

US 2002/0017096 A1 Feb. 14, 2002

(30) Foreign Application Priority Data

Jul. 4, 2000 (GB) .............................................. 0016311

(51) Int. Cl.[7] .................................................. F02K 3/04
(52) U.S. Cl. ...................................... 60/226.1; 60/226.3
(58) Field of Search ............................ 60/226.1, 226.3, 60/262, 728

(56) References Cited

U.S. PATENT DOCUMENTS

| | | | | |
|---|---|---|---|---|
| 3,792,584 A | * | 2/1974 | Klees .......................... | 60/226.3 |
| 4,010,608 A | * | 3/1977 | Simmons ...................... | 60/226.3 |
| 4,409,788 A | * | 10/1983 | Nash et al. .................. | 60/226.3 |

* cited by examiner

Primary Examiner—Michael Koczo

(57) ABSTRACT

This jet engine comprises of a complete low bypass turbofan unit 1 including secondary fan unit 2 and engine core, some five to eight feet ahead of which sits a larger diameter main fan unit 3 driven from the turbofan 1 via drive shaft 4. Between the main and secondary fans sits a reversed variable area nozzle 5 connected to the forward end of the secondary fan by a short inlet tube 6, fitted with intercooler 12. At the back of said core sits another variable area nozzle 7 facing rearwards. This arrangement; front nozzle, inlet tube, secondary fan, core, rear nozzle, is enclosed by a variable diameter cylinder 8, providing a variable area bypass duct 9 between cylinder and engine outer casing 10 that extends backwards from the outer diameter of said main fan. A third variable area nozzle 11 is positioned aft of the outer casing facing rearwards.

4 Claims, 9 Drawing Sheets

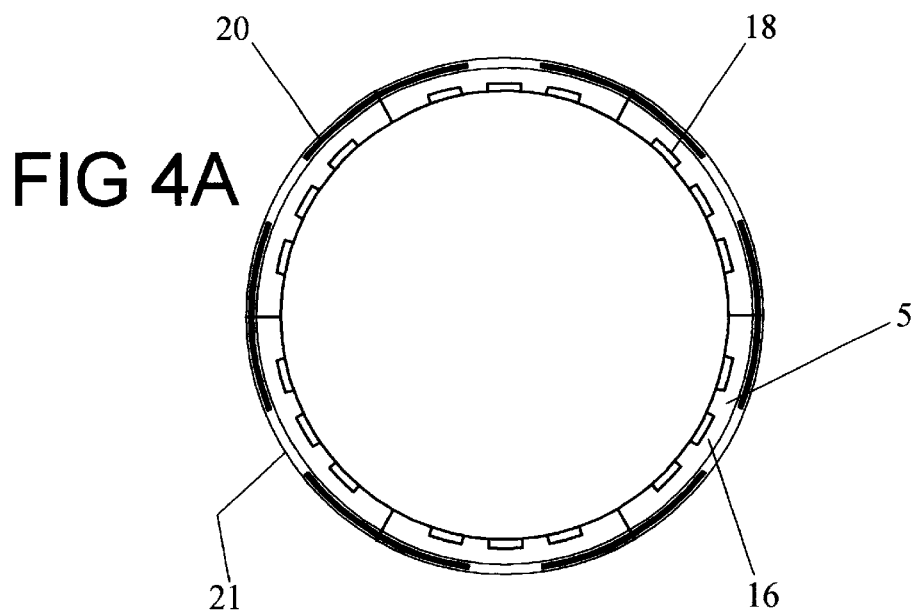
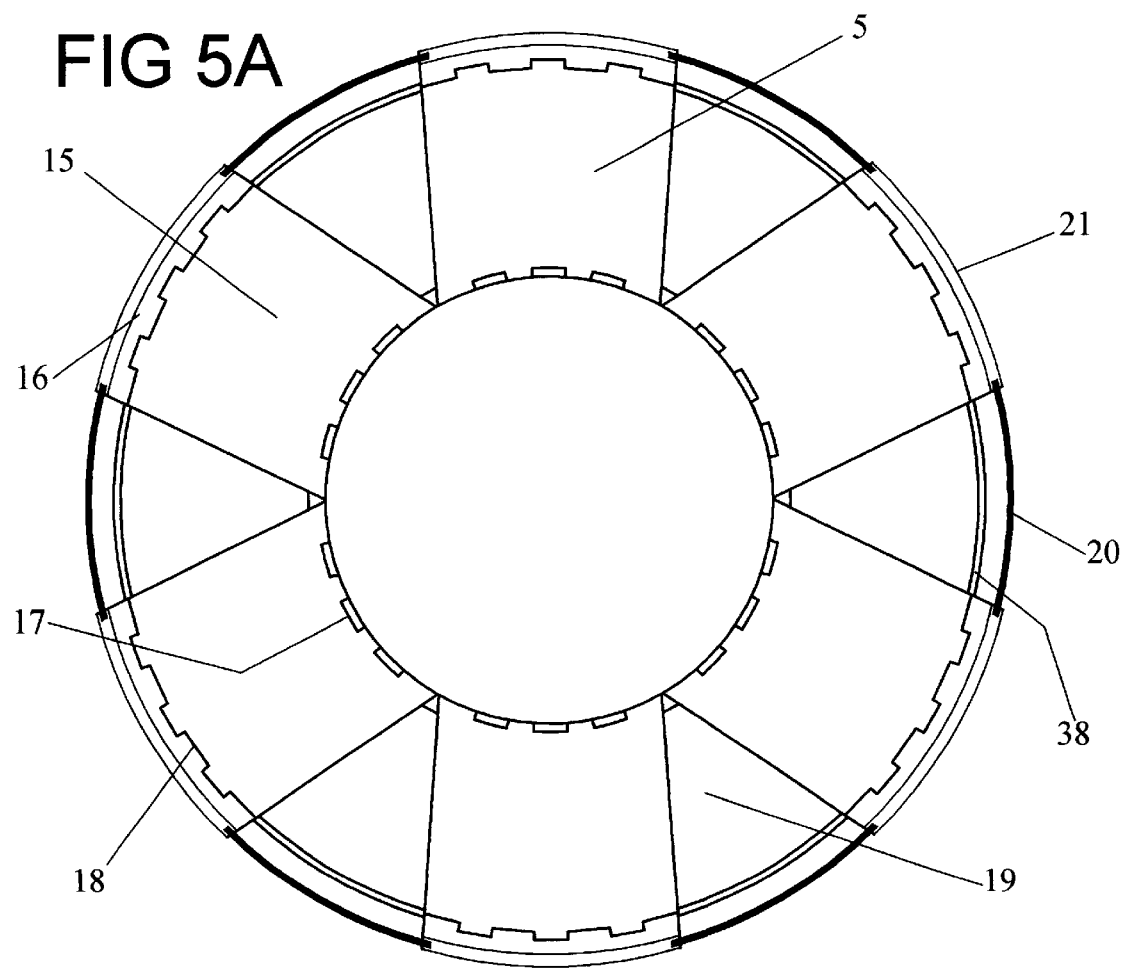

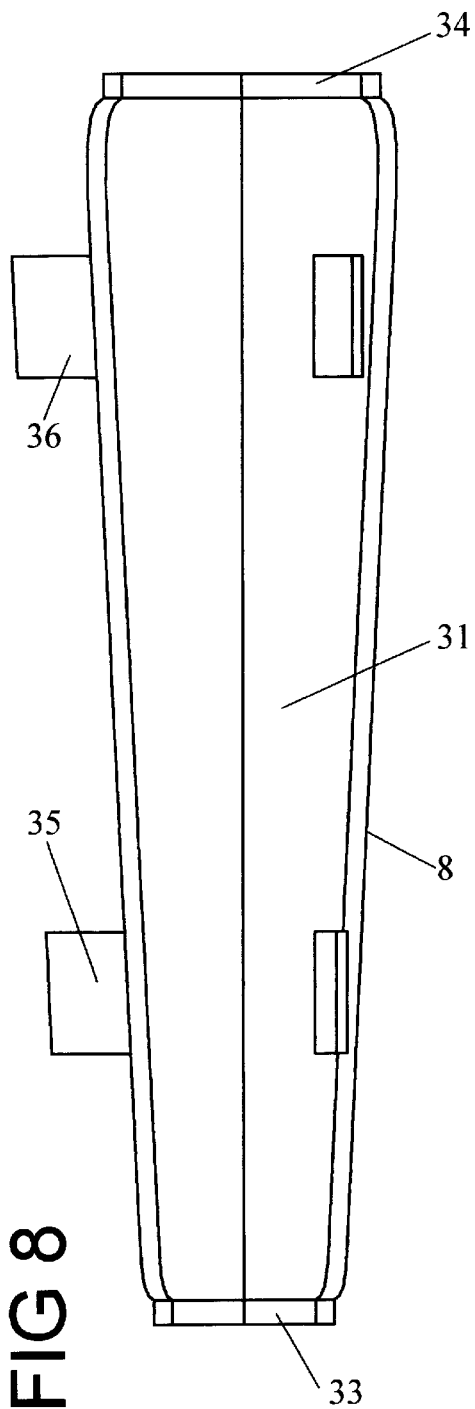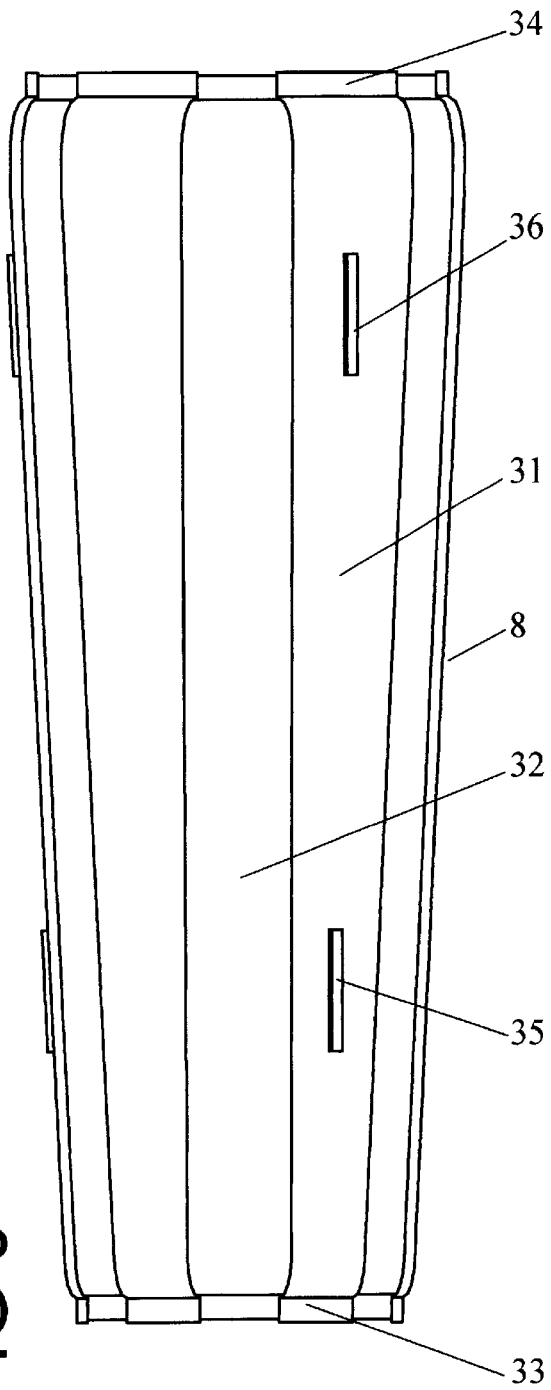

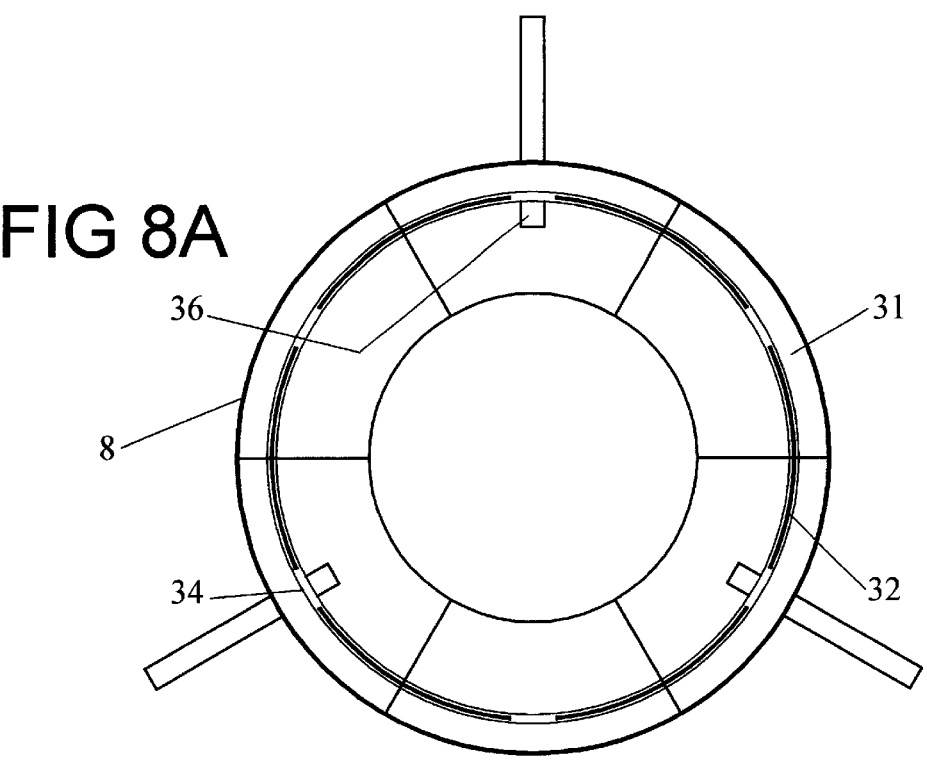
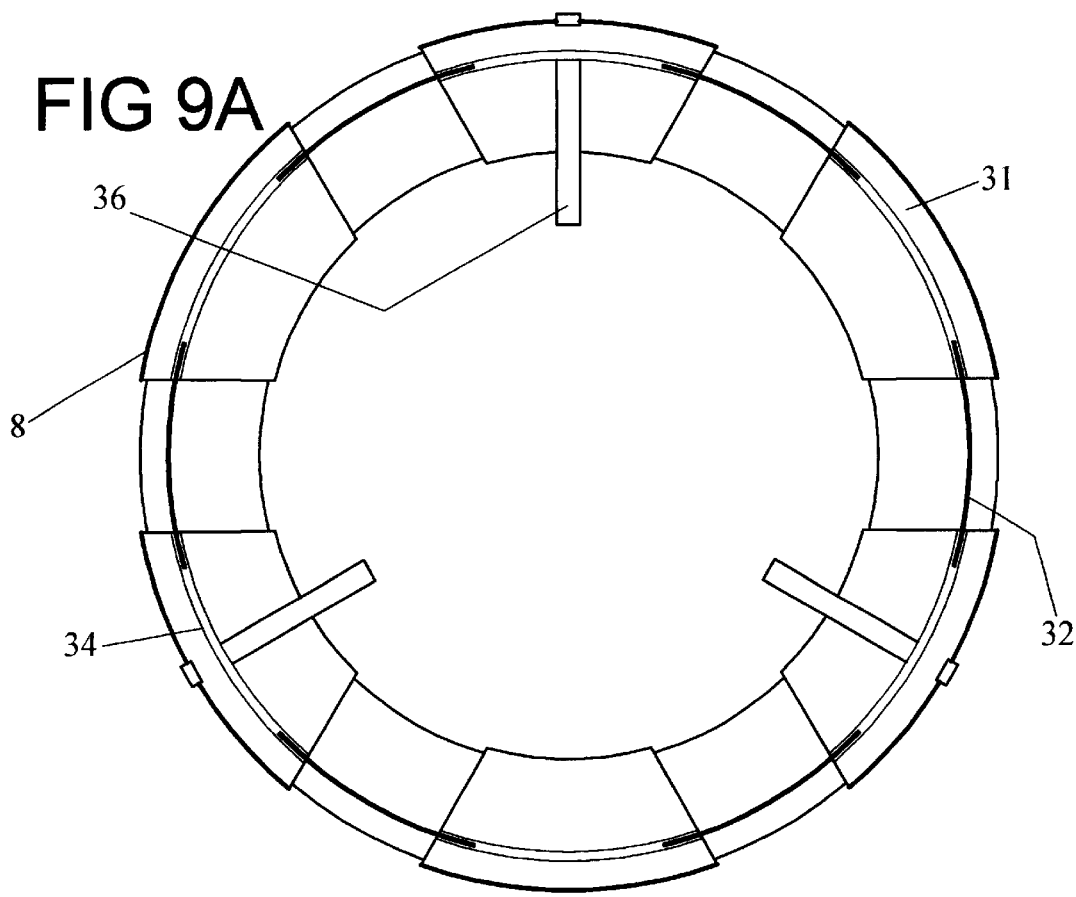

VARIABLE MODE JET ENGINE—COMPACT

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

1. Background of the Invention

This invention relates to a variable mode; turbofan, turbojet and ramjet type jet engine, which is suitable for compact installation. Jet engines are normally built in fixed mode either as turbofans, turbojets or ramjets, this invention sets out to combine all types of engine.

2. Brief Summary of the Invention

According to the present invention there is provided a jet engine comprising of a complete low bypass turbofan unit including secondary fan unit and engine core; compressor, combustion chambers, turbines and secondary bypass duct. Some five to eight feet ahead of which sits a larger diameter main fan unit, driven from the front of the turbofan via a short drive shaft. Between the main fan and the secondary fan sits a reversed front inner variable area nozzle, connected to the forward end of the secondary fan in line by a short inlet tube. The nozzle is arranged to form a ram from the main fan into the secondary fan when open. At the back of the engine core sits another, rear inner, variable area nozzle facing rearwards in line. The whole of this arrangement; front inner nozzle, inlet tube, secondary fan, engine core, secondary bypass duct and rear inner nozzle, is enclosed by a variable diameter cylinder, providing a main variable area bypass duct between the cylinder and the engine outer casing, which extends backwards from the outer diameter of the main fan and completely encloses the cylinder within. A third, main, variable area nozzle is positioned aft of the outer casing facing rearwards. An intercooler is fitted in line in or around the inlet tube just ahead of the secondary fan to cool down the incoming air charge.

BRIEF DESCRIPTION OF THE SEVERAL VIEWS OF THE DRAWING

FIG. 4A illustrates the front inner nozzle in the fully closed position, viewed from the front.

FIG. 5A illustrates the front inner nozzle in the fully opened position, viewed from the front.

FIG. 8 illustrates the variable diameter cylinder in the fully closed position, viewed from the side.

FIG. 8A illustrates the variable diameter cylinder in the fully closed position, viewed from the back.

FIG. 9 illustrates the variable diameter cylinder in the fully opened position, viewed from the side.

FIG. 9A illustrates the variable diameter cylinder in the fully opened position, viewed from the back.

DETAILED DESCRIPTION OF THE INVENTION

Figure 1:
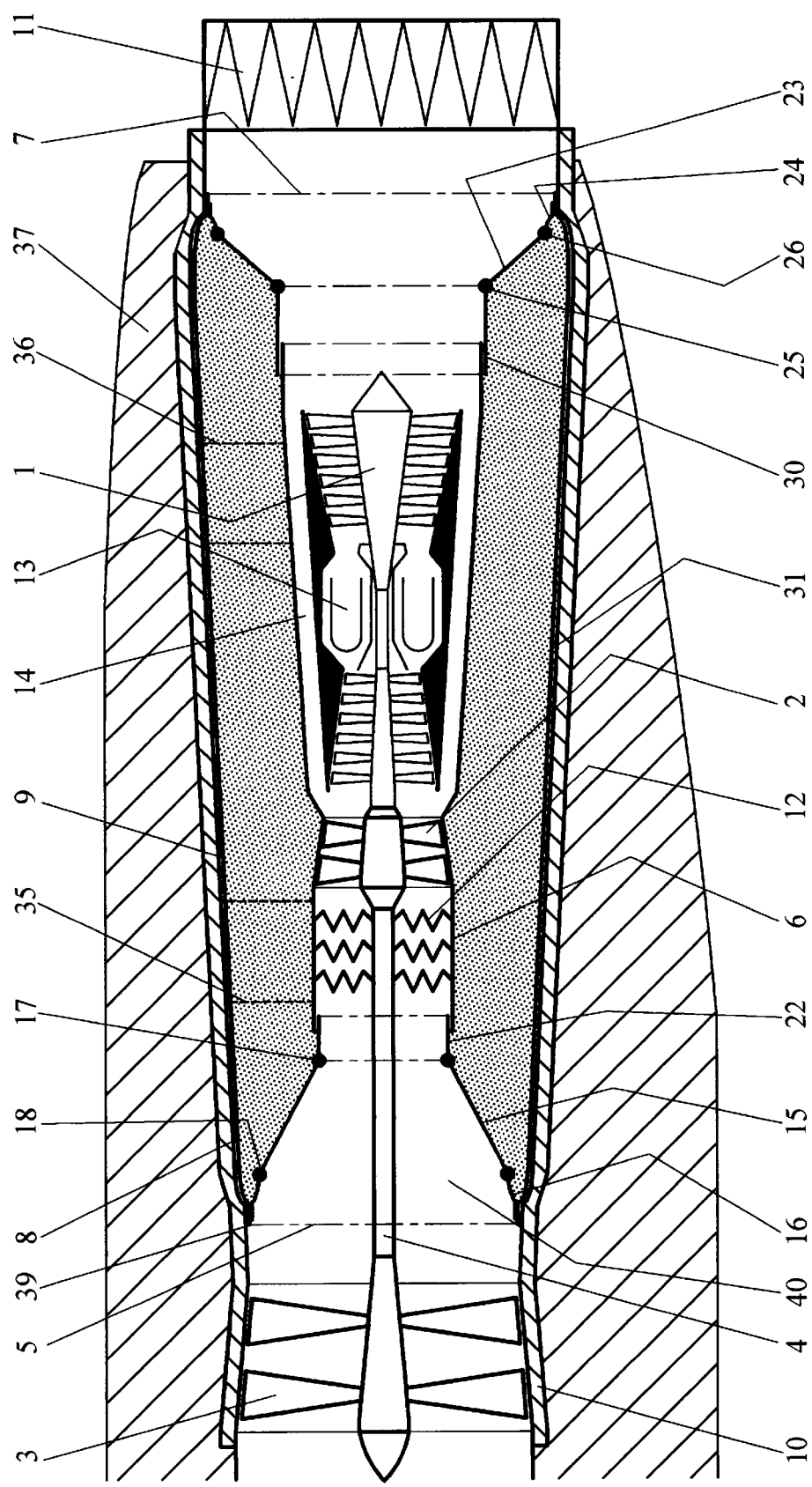
FIG. 1 illustrates the low bypass turbofan/ramjet mode, ramfan; the front and rear inner nozzles and variable diameter cylinder are completely opened, with the main bypass area totally closed off, thereby ramming the airflow from the main fan into the secondary fan and hence supercharging the secondary fan and engine core at subsonic speeds, and forming a ramjet at supersonic speeds, albeit with rotating inner parts. There is no need for an afterburner on this type of engine.
Figure 2:
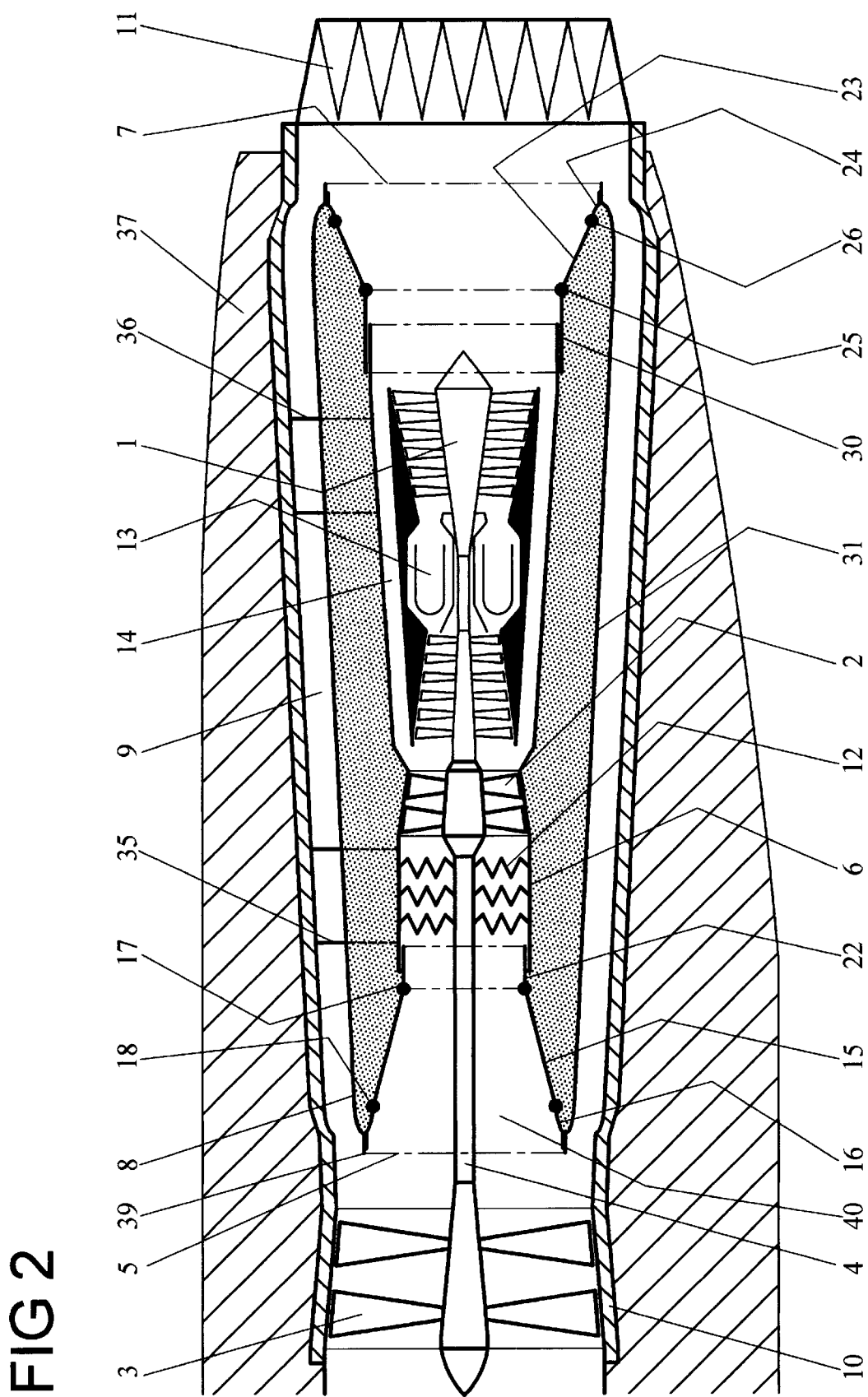
FIG. 2 illustrates the transition between modes and intermediate bypass mode; at subsonic speeds the front and rear inner nozzles and variable diameter cylinder are partially opened, splitting the main fan thrust and thereby only partially supercharging and partially bypassing the secondary fan and engine core.
Figure 3:
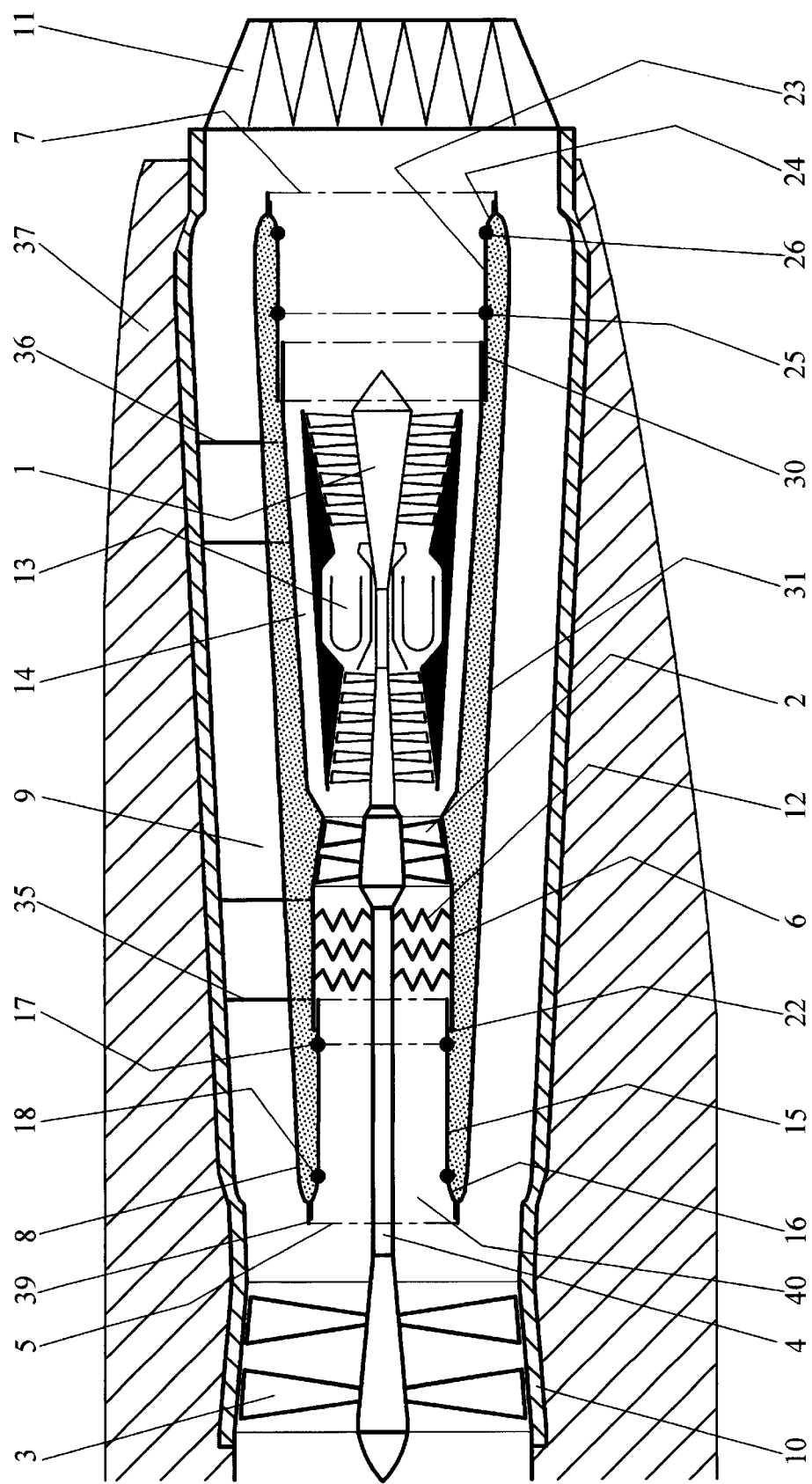
FIG. 3 illustrates the high bypass turbofan mode; at subsonic speeds the front and rear inner nozzles and variable diameter cylinder are totally closed allowing the outer portion of the main fan to completely bypass the secondary fan and engine core.
Figure 4:
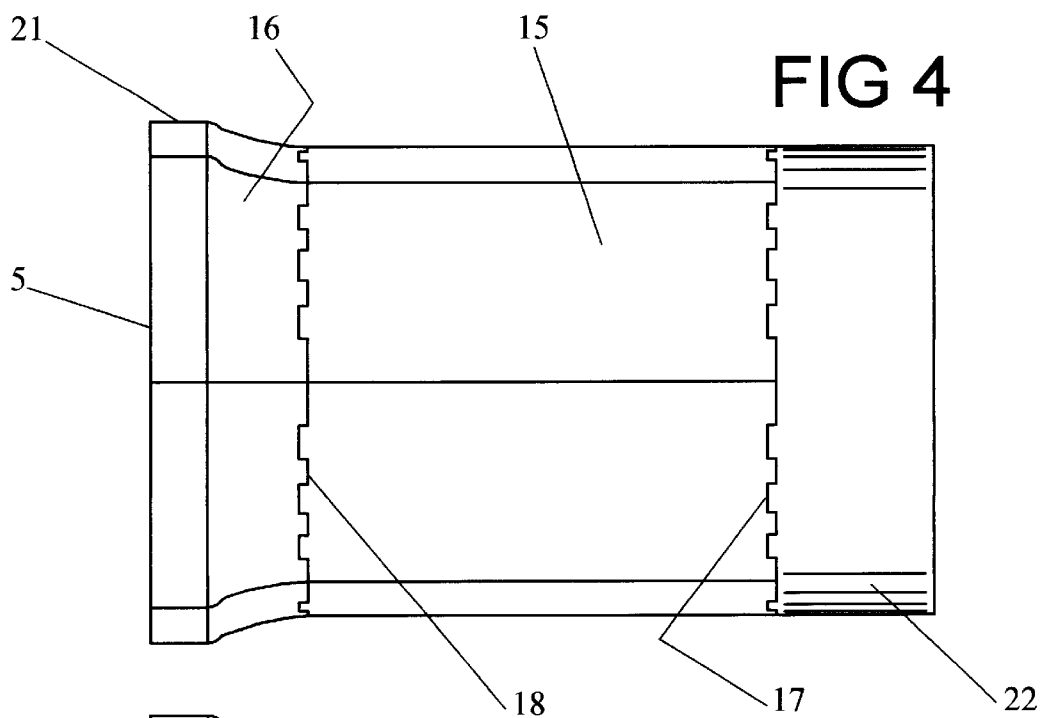
FIG. 4 illustrates the front inner nozzle in the fully closed position, viewed from the side.
Figure 5:
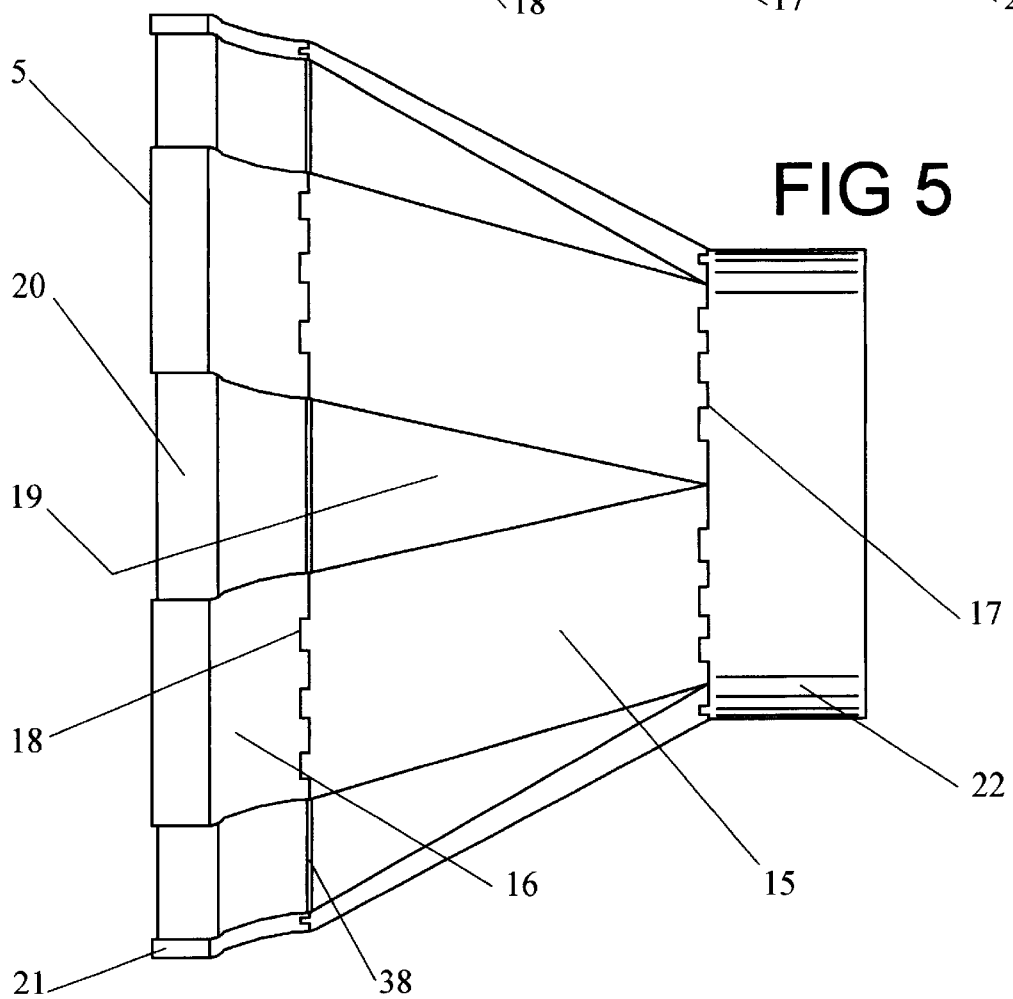
FIG. 5 illustrates the front inner nozzle in the fully opened position, viewed from the side.
Figure 6:
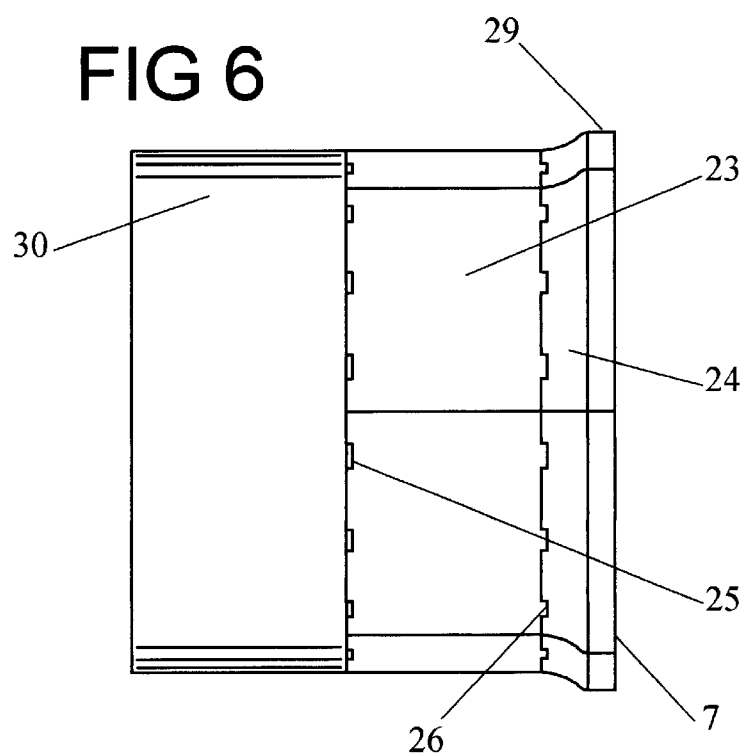
FIG. 6 illustrates the rear inner nozzle in the fully closed position, viewed from the side.
Figure 7:
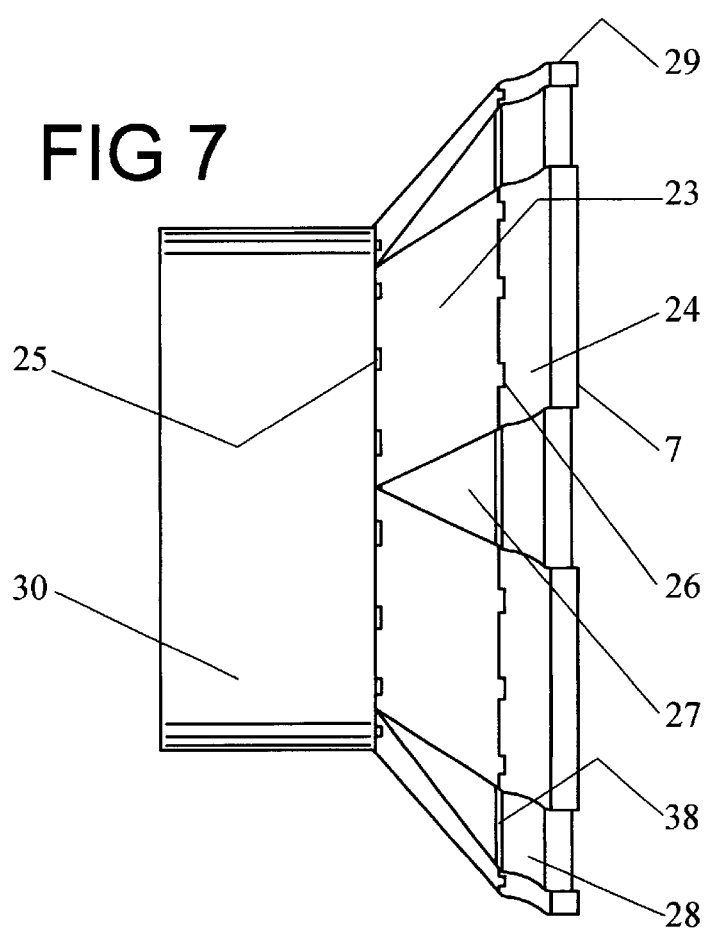
FIG. 7 illustrates the rear inner nozzle in the fully opened position, viewed from the side.
Figure 6A:
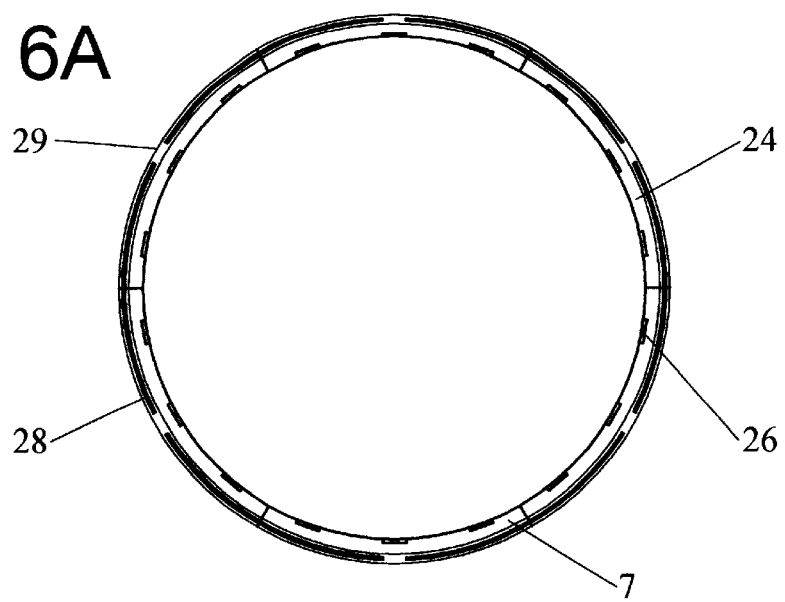
FIG. 6A illustrates the rear inner nozzle in the fully closed position, viewed from the back.
Figure 7A:
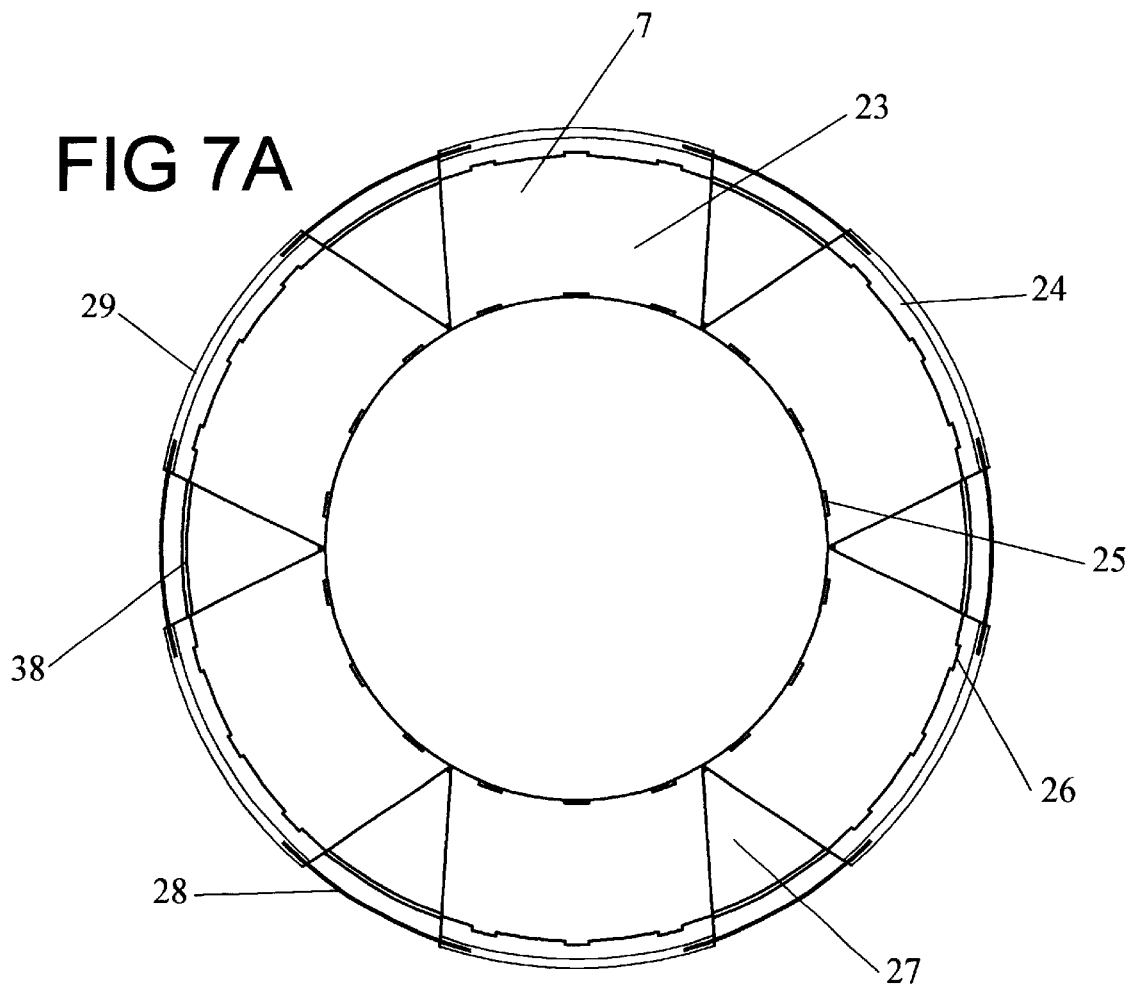
FIG. 7A illustrates the rear inner nozzle in the fully opened position, viewed from the back.

Referring to the drawings, FIG. 1, FIG. 2 and FIG. 3, there is provided a jet engine comprising of a complete low bypass turbofan unit 1, including secondary fan unit 2 and engine core; compressor, combustion chambers, turbines and secondary bypass duct 14. The duct 14 is of fixed ratio and is tuned by the engine designer for maximum Mach number required, the duct 14 can be omitted from the engine construction, thereby making the core a pure turbojet, and providing higher supersonic performance. The turbofan 1 is held in position by three front engine supports 35, and three rear engine supports 36. Some five to eight feet ahead of fan 2 sits a larger diameter main fan unit 3 driven from the front of the turbofan 1 via a short drive shaft 4. The fan 3 is 2.5 to 3.5 times greater in frontal area than fan 2.

Between fans 3 and 2 sits a reversed front inner variable area nozzle 5, connected to the forward end of the turbofan 1 in line by a short inlet tube 6, and arranged so the variable end faces forwards and is positioned just behind fan 3, and forming a ram 40 into fan 2.

At the back of the core sits another, rear inner, variable area nozzle 7, facing rearwards in line. The whole of this arrangement; nozzle 5, inlet tube 6, fan 2, engine core, bypass duct 14 and nozzle 7, is enclosed by a variable diameter cylinder 8, providing the main variable area bypass duct 9 between cylinder 8 and the engine outer casing 10, which extends backwards from the outer diameter of fan 3, and completely encloses the cylinder 8 within. The casing 10 can either be an engine part or, alternatively, a part of the airframe 37. A third, main, variable area nozzle 11 is positioned aft of casing 10, facing rearwards.

An intercooler 12 is fitted in line, in or around inlet tube 6, ahead of fan 2, to cool down the incoming air charge. The engine core has two-stage combustion chambers 13 to supply extra fuel to ignite the extra oxygen provided by fan 3 supercharging effect in low bypass turbofan mode. The chambers are built strong enough to allow for approximately three times normal pressure in supercharged mode.

Referring to drawings FIG. 1, FIG. 2, FIG. 3, FIG. 4, FIG. 4A, FIG. 5 and FIG. 5A, the nozzle 5 is constructed of six main hinged plates 15, with hinges 17, six secondary hinged plates 16, with hinges 18, and six main interleaved sliding plates 19 with six secondary interleaved sliding plates 20. The hinges 17 are attached to a sliding tube 22 which fits inside tube 6. A fixing area 21 is provided. An expanding seal 38 is fitted between plates 19 and 20. The complete nozzle 5 is fully sealed.

Referring to drawings FIG. 1, FIG. 2, FIG. 3, FIG. 6, FIG. 6A, FIG. 7 and FIG. 7A, the nozzle 7 is constructed of six main hinged plates 23, with hinges 25, six secondary hinged plates 24, with hinges 26, and six main interleaved sliding plates 27 with six secondary interleaved sliding plates 28. The hinges 25 are attached to a sliding tube 30 which fits outside the duct 14. A fixing area 21 is provided. An expanding seal 38 is fitted between plates 27 and 28. The complete nozzle 7 is fully sealed.

Referring to drawings FIG. 1, FIG. 2, FIG. 3, FIG. 8, FIG. 8A, FIG. 9 and FIG. 9A, the cylinder 8 is constructed of six main plates 31 and six interleaved sliding plates 32. Fixing areas front 33 and rear 34 are provided.

The nozzle 5 is attached to the forward end of cylinder 8 using fixing areas 21 and 33. The nozzle 7 is attached to the rearward end of cylinder 8 using fixing areas 29 and 34. All joints are fully sealed. Cylinder 8 front edge overlaps nozzle 5 forming a flow splitter 39.

The splitter 39 provides a smooth and aerodynamic airflow at all times. The ram 40 provides fan 2 with a subsonic airflow at all times. The fan 3 freewheels at supersonic speeds, allowing the airflow to pass straight through into ram 40.

The nozzle 5 and cylinder 8 totally shut off main bypass 9 when fully open, providing fully supercharged low bypass turbofan mode at subsonic speeds, and providing ramjet mode at supersonic speeds. The nozzle 5 and cylinder 8 totally shut off the supercharging when fully closed, providing high bypass turbofan engine mode at subsonic speeds. This engine has no afterburner or thrust augmentation of any kind.

The ideal main bypass ratio for this type of engine is around 1.6:1. The ideal secondary bypass ratio for this type of engine is zero, but this does not allow for cooling of the engine core and rear exhaust.

The large main fan 3 in this design has in effect replaced the afterburner normally provided for on a conventional low bypass turbofan.

It is not possible to replace a normal afterburning low bypass type jet engine directly with this type of engine in the same airframe. For example, replacing an engine, equally, with an inlet diameter of 34 inches only produces a static thrust of about 21000 pounds, in supercharged low bypass turbofan mode, for this type of engine. In this instance the main fan diameter needs to be increased to about 39 inches, to produce around 28500 pounds of static thrust.

Below are some typical figures for this type of engine:

| Main fan diameter | 46 inches |
| Secondary fan diameter | 28 inches |

-continued

| Main bypass ratio | 1.35:1 |
| Secondary bypass ratio | 0.20:1 |
| Static power from main fan (High bypass turbofan mode) | 13500 pounds |
| Static power from rear turbofan (High bypass turbofan mode) | 13500 pounds |
| Static combined power (High bypass turbofan mode) | 27000 pounds |
| Static combined power (Supercharged low bypass turbofan mode) | 40500 pounds |

What is claimed is:

1. A variable bypass jet engine wherein supersonic performance is achieved entirely with the use of supercharging and ram effect, no afterburner or thrust augmentation of any kind is employed, comprising of:

a complete low bypass turbofan including secondary fan unit and engine core comprising; compressor, combustion chambers, turbines and secondary bypass duct;

a larger diameter main fan unit drivingly connected to said turbofan via a short drive shaft or shafts;

said main fan is 2.5 to 3.5 times greater in frontal area than said secondary fan;

a reversed front inner variable area nozzle;

said front inner nozzle is connected to the forward end of said secondary fan by a short in line inlet tube;

said front inner nozzle is constructed of six main hinged plates, with hinges attaching to a forward mounted sliding tube at the rear, and hinges connecting six secondary hinged plates to the fore, six main interleaved sliding plates and six secondary interleaved sliding plates;

said forward mounted sliding tube fits inside said inlet tube;

an expanding seal fitted between said main and secondary sliding plates;

a fixing area provided at the leading edge of said secondary hinged plates;

said front inner nozzle is fully sealed;

a rear inner variable area nozzle facing rearwards in line, situated at the back of said core;

said rear inner nozzle is connected to the rearward end of said secondary bypass duct;

said rear inner nozzle is constructed of six main hinged plates, with hinges attaching to a rear mounted sliding tube at the fore, and hinges connecting six secondary hinged plates to the rear, six main interleaved sliding plates and six secondary interleaved sliding plates;

said rear mounted sliding tube fits outside said secondary bypass duct;

an expanding seal fitted between said main and secondary sliding plates;

a fixing area provided at the trailing edge of said secondary hinged plates;

said rear inner nozzle is fully sealed;

a variable diameter cylinder enclosing said front inner nozzle, inlet tube, secondary fan, core, secondary bypass duct and rear inner nozzle;

said cylinder is constructed of six main plates and six interleaved sliding plates;

fixing areas provided at the front and rear of said cylinder;

said front inner nozzle is attached to the forward end of said cylinder using said fixing areas provided, said rear inner nozzle is attached to the rearward end of said cylinder using fixing areas provided;

fully sealed attachment joints;

said cylinder front edge overlaps said front inner nozzle forming a flow splitter;

an engine outer casing extending backwards from the outer diameter of said main fan and completely enclosing said cylinder within;

said casing provides the main variable area bypass duct between said cylinder and said casing;

said splitter provides a smooth and aerodynamic airflow with said cylinder in any position;

said front inner nozzle forms a ram into said secondary fan when said nozzle is opened;

said nozzle and cylinder totally shut off said main bypass when fully open, providing fully supercharged low bypass turbofan mode at subsonic speeds, and providing ramjet mode at supersonic speeds;

said main fan freewheels at supersonic speeds, allowing the airflow to pass straight through into said ram;

said ram provides said secondary fan with a subsonic airflow at all speeds;

said nozzle and cylinder totally shut off the supercharging when fully closed, providing high bypass turbofan engine mode;

a set of two-stage combustion chambers, to provide extra fuel in said supercharged mode, fitted within said engine core;

a third main variable area nozzle positioned aft of said casing, facing rearwards.

2. A variable bypass jet engine as claimed in claim 1 wherein there is fitted an intercooling device interposed between said main and secondary fans, fitted in or around said inlet tube, to cool down the incoming air charge.

3. A variable bypass jet engine as claimed in claim 1 wherein said engine casing is an integral part of the airframe.

4. A variable bypass jet engine as claimed in claim 1 wherein said secondary bypass duct is of a fixed ratio and is tuned by the engine designer between a minimum bypass ratio of zero and a maximum of 1.0, for Mach number required.

* * * * *